(12) United States Patent
Kelly

(10) Patent No.: US 10,029,687 B2
(45) Date of Patent: Jul. 24, 2018

(54) AUTOMATICALLY CONTROLLING VEHICLE SPEED IN ACCORDANCE WITH A SET-SPEED

(71) Applicant: JAGUAR LAND ROVER LIMITED, Whitley, Coventry, Warwickshire (GB)

(72) Inventor: James Kelly, Solihull (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 78 days.

(21) Appl. No.: 15/306,625

(22) PCT Filed: Apr. 20, 2015

(86) PCT No.: PCT/EP2015/058462
§ 371 (c)(1),
(2) Date: Oct. 25, 2016

(87) PCT Pub. No.: WO2015/165759
PCT Pub. Date: Nov. 5, 2015

(65) Prior Publication Data
US 2017/0043778 A1 Feb. 16, 2017

(30) Foreign Application Priority Data
May 1, 2014 (GB) .................................. 1407663.2

(51) Int. Cl.
*B60T 8/32* (2006.01)
*G05D 1/00* (2006.01)
(Continued)

(52) U.S. Cl.
CPC ......... *B60W 30/18027* (2013.01); *B60T 7/22* (2013.01); *B60W 10/06* (2013.01);
(Continued)

(58) Field of Classification Search
CPC ....... B60T 7/22; B60W 10/06; B60W 10/184; B60W 30/143; B60W 40/06; B60W 50/10
(Continued)

(56) References Cited

U.S. PATENT DOCUMENTS 3,777,841 A 12/1973 Thorner
6,185,499 B1 2/2001 Kinoshita et al.
(Continued)

FOREIGN PATENT DOCUMENTS

JP H09290665 A 11/1997
JP H1159221 A 3/1999
(Continued)

OTHER PUBLICATIONS

International Search Report for International Application No. PCT/EP2015/058462, dated Jul. 3, 2015, 3 pages.
(Continued)

*Primary Examiner* — Maceeh Anwari
(74) *Attorney, Agent, or Firm* — Reising Ethington P.C.

(57) ABSTRACT

A method of operating an automatic speed control system of a vehicle in accordance with a set-speed. The method comprises receiving electrical signal(s) representative of a vehicle occupant-initiated brake command to slow the vehicle to a stop, and in response, suspending automatic speed control in accordance with said set-speed and commanding the application of a retarding torque to one or more wheels of the vehicle to bring the vehicle to a stop, while maintaining the speed control system in an active state. The method further comprises receiving electrical signal(s) representative of a vehicle occupant-initiated brake release command, and in response, and while maintaining the speed control system in an active state, automatically commanding the generation of drive torque sufficient to propel the vehicle (Continued)

in an intended direction and automatically controlling the speed of the vehicle in accordance with said set-speed.

32 Claims, 4 Drawing Sheets

(51) Int. Cl.
| | | |
|---|---|---|
| *G06F 7/00* | (2006.01) | |
| *G06F 17/00* | (2006.01) | |
| *B60W 30/18* | (2012.01) | |
| *B60W 50/10* | (2012.01) | |
| *B60T 7/22* | (2006.01) | |
| *B60W 10/06* | (2006.01) | |
| *B60W 10/184* | (2012.01) | |
| *B60W 30/14* | (2006.01) | |
| *B60W 40/06* | (2012.01) | |

(52) U.S. Cl.
CPC ........ *B60W 10/184* (2013.01); *B60W 30/143* (2013.01); *B60W 40/06* (2013.01); *B60W 50/10* (2013.01); B60T 2201/02 (2013.01); B60T 2210/16 (2013.01); B60W 2540/12 (2013.01); B60W 2710/0666 (2013.01); *B60W 2720/10* (2013.01); *B60W 2720/106* (2013.01)

(58) Field of Classification Search
USPC .......................................................... 701/93
See application file for complete search history.

(56) References Cited

U.S. PATENT DOCUMENTS

| | | |
|---|---|---|
| 2003/0045990 A1 | 3/2003 | Adachi |
| 2007/0215401 A1 | 9/2007 | Braeuchle et al. |
| 2015/0232093 A1 | 8/2015 | Fairgrieve et al. |

FOREIGN PATENT DOCUMENTS

| | | |
|---|---|---|
| JP | 2003063272 A | 3/2003 |
| WO | WO2005061264 A1 | 7/2005 |
| WO | WO2014027098 A1 | 2/2014 |

OTHER PUBLICATIONS

Written Opinion for International Application No. PCT/EP2015/058462, dated Jul. 3, 2015, 5 pages.

Japanese Office action in Japanese with English summary for JP application No. 2016-565448, dated Aug. 1, 2017, 6 pages.

AUTOMATICALLY CONTROLLING VEHICLE SPEED IN ACCORDANCE WITH A SET-SPEED

TECHNICAL FIELD

The present invention relates to automatic speed control of a vehicle and particularly, but not exclusively, to an automatic speed control system for a vehicle having off-road capability. Aspects of the invention relate to a method, to a system, to a non-transitory computer-readable storage medium, and to a vehicle.

BACKGROUND

In known vehicle speed control systems, typically referred to as cruise control systems, a set-speed for the vehicle may be initially set by manually bringing the vehicle up to the desired speed and then manipulating a user-selectable user interface device, such as, for example, a pushbutton, to set that speed as the set-speed. When the user wants to change the set-speed thereafter, the same or a different user input device may be manipulated to increase or decrease the set-speed. In response to a requested or commanded change in set-speed, the speed control system causes the vehicle to accelerate or decelerate, as appropriate, to reach or match the new set-speed by sending commands to one or more vehicle subsystems, such as, for example, the powertrain and/or brake subsystems of the vehicle.

One disadvantage of such known speed control systems, however, is that if a user (e.g., driver) brings the vehicle to a stop or a standstill by, for example, actuating or manipulating a brake pedal of the vehicle, the system may interpret this action as an indication that the user wishes to override the speed control functionality performed by the speed control system, and as a result, the functionality of the speed control system may be deactivated or cancelled. In order for the speed control system to then once again assume control of the vehicle speed when the vehicle resumes movement or progress in an intended direction of travel (e.g., when the user releases the brake pedal), the user has to manipulate an appropriate user interface device (e.g., a pushbutton) to indicate his/her desire for the speed control system to do so. While this functionality may be appropriate for on highway driving, the need for user interaction to reactivate the speed control system each time the user brings the vehicle to a stop increases the workload on the user and may become a source of irritation to the user and/or hinder the user's enjoyment, especially in instances where the vehicle is traversing rough terrain, for example when driving off road.

Accordingly, it is an aim of the present invention to address, for example, the disadvantages identified above.

SUMMARY OF THE INVENTION

According to one aspect of the invention, there is provided a method of operating an automatic speed control system of a vehicle in accordance with a set-speed. In an embodiment, the method comprises: receiving at least one electrical signal representative of a vehicle occupant-initiated brake command to slow the vehicle to a stop; in response to the brake command, automatically suspending increases in drive torque to the wheels of the vehicle for the duration of the brake command and applying a retarding torque to one or more wheels of the vehicle to bring the vehicle to a stop, while maintaining the speed control system in an active state; receiving at least one electrical signal representative of a vehicle occupant-initiated brake release command; and, in response to the brake release command and while maintaining the speed control system in an active state, automatically commanding the generation of a drive torque sufficient to propel the vehicle in an intended direction of travel and automatically controlling the speed of the vehicle in accordance with said set-speed.

According to another aspect of the invention, there is a provided an automatic speed control system operable to control the speed of a vehicle in accordance with a set-speed. In an embodiment, the system comprises: an electronic processor; and an electronic memory device electrically coupled to the electronic processor and having instructions stored therein. The processor is configured to access the memory device and execute the instructions stored therein such that the system is operable to: receive at least one electrical signal representative of a vehicle occupant-initiated brake command to slow the vehicle to a stop; in response to the brake command, automatically suspend increases in drive torque to the wheels of the vehicle for the duration of the brake command and apply a retarding torque to one or more wheels of the vehicle to bring the vehicle to a stop, while maintaining the speed control system in an active state; receive at least one electrical signal representative of a vehicle occupant-initiated brake release command; and, in response to the brake release command and while maintaining the speed control system in an active state, automatically command the generation of a drive torque sufficient to propel the vehicle in an intended direction of travel and automatically control the speed of the vehicle in accordance with said set-speed.

According to yet another aspect of the invention there is provided a vehicle comprising a powertrain for generating a drive torque, a braking system for generating a retarding torque, and the automatic speed control system as described herein.

According to a further aspect of the invention, there is provided a non-transitory, computer-readable storage medium storing instructions thereon that when executed by one or more electronic processors causes the one or more processors to carry out the method described herein.

According to a still further aspect of the invention, there is provided an electronic controller for a vehicle having a storage medium associated therewith storing instructions that when executed by the controller cause the automatic speed control of a vehicle in accordance with the method of: receiving at least one electrical signal representative of a vehicle occupant-initiated brake command to slow the vehicle to a stop; in response to the brake command, suspending automatic speed control in accordance with said set-speed and applying a retarding torque to one or more wheels of the vehicle to bring the vehicle to a stop while maintaining the speed control system in an active state when the vehicle comes to a stop; receiving at least one electrical signal representative of a vehicle occupant-initiated brake release command; and in response to the brake release command, and while maintaining the speed control system in an active state, automatically commanding the generation of a drive torque sufficient to propel the vehicle in an intended direction of travel and automatically controlling the speed of the vehicle in accordance with said set-speed.

Optional features of the various aspects of the invention are set out below in the dependent claims.

Embodiments of the present invention have the advantage that the speed control system may be maintained in an active state as the user brings the vehicle to a stop (e.g., by actuating a brake pedal of the vehicle) and then subsequently initiates a brake release command (e.g. by releasing the brake pedal) to resume movement or progress of the vehicle in an intended direction of travel, which allows the speed control system to once again assume control of the vehicle speed without requiring any user interaction other than the initiation of the brake release command (e.g., the release of the brake pedal). Accordingly, in an embodiment, progress of the vehicle may be controlled solely by use of, for example, the brake pedal of the vehicle, which greatly reduces user workload and user irritation as compared to having to manually reactivate the speed control system following the vehicle being brought to a stop or standstill, and also increasing the enjoyment of the user/vehicle occupant(s).

Within the scope of this application it is expressly intended that the various aspects, embodiments, examples, and alternatives set out in the preceding paragraphs, in the claims, and/or in the following description and drawings, and in particular the individual features thereof, may be taken independently or in any combination. Features described in connection with an embodiment are applicable to all embodiments, unless such feature(s) is/are incompatible.

BRIEF DESCRIPTION OF THE DRAWINGS

One or more embodiments of the invention will now be described, by way of example only, with reference to the following figures in which.

DETAILED DESCRIPTION

The system and method described herein may be used to automatically control the speed of a vehicle in accordance with a set-speed. In an embodiment, the present system and method receive one or more electrical signals representative of a user- or vehicle occupant-initiated brake command to slow the vehicle to a stop, and in response thereto, suspend increases in drive torque to the wheels of the vehicle for the duration of the brake command and also command the application of a retarding torque to one or more wheels of the vehicle to bring the vehicle to a stop, while maintaining the speed control system in an active state when the vehicle comes to a stop. The system and method further receive one or more electrical signals representative of a user- or vehicle occupant-initiated brake release command, and in response thereto and while maintaining the speed control system in the active state, automatically command the generation of a drive torque sufficient to propel the vehicle and also automatically control the speed of the vehicle in accordance with the set-speed.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present invention.

Figure 1:
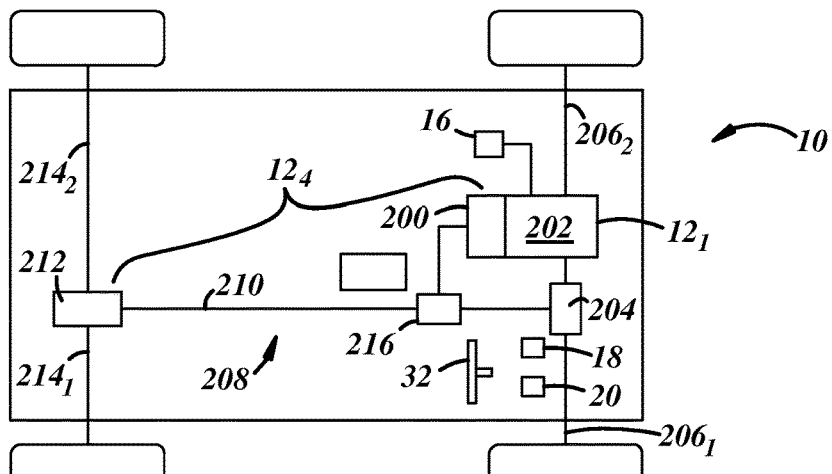
FIG. 1 is a schematic and block diagram of a vehicle.
Figure 2:
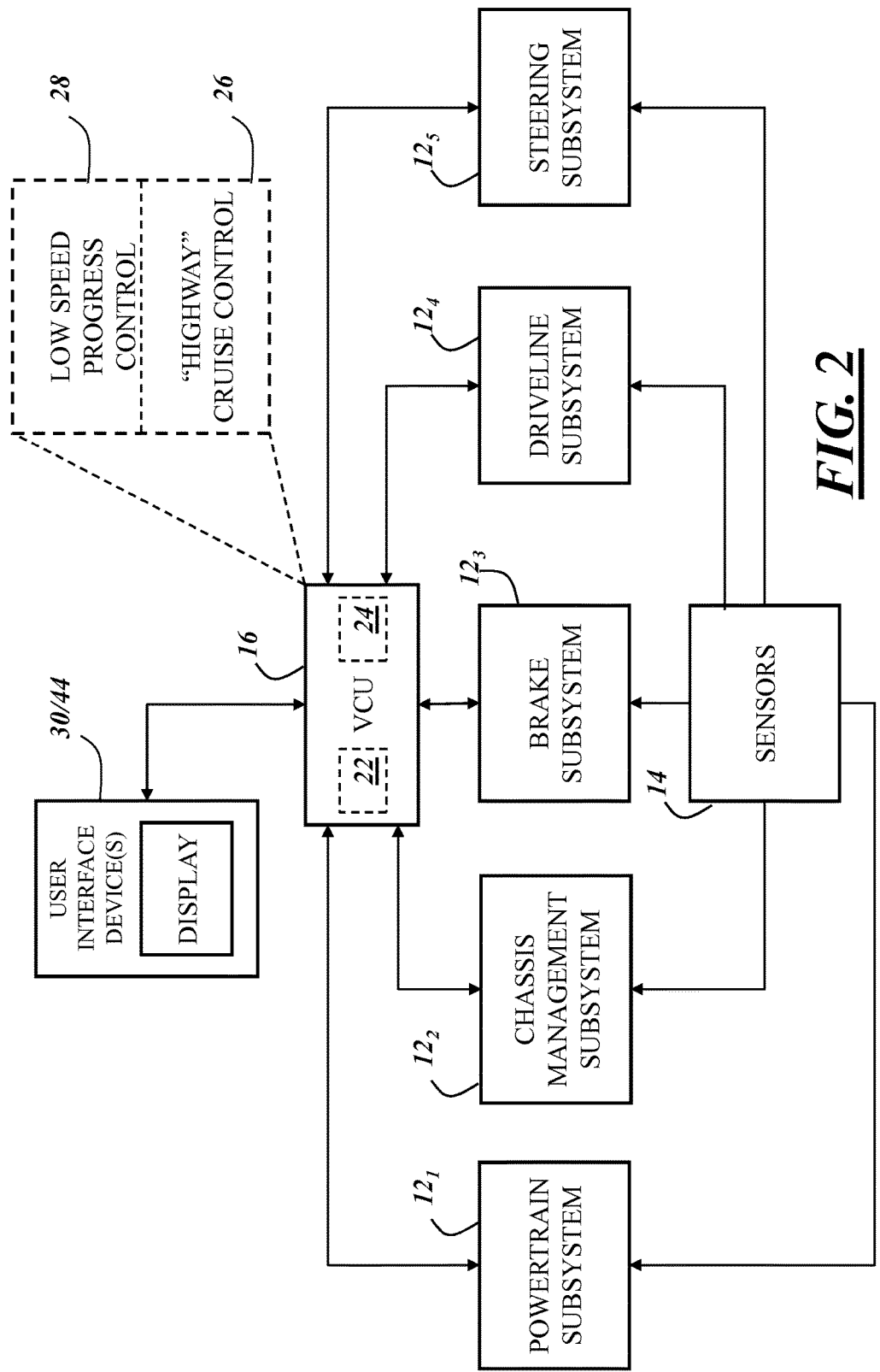
FIG. 2 is another block diagram of the vehicle illustrated in FIG. 1.

With reference to FIGS. 1 and 2, there are shown some of the components of a vehicle 10 with which the present system and method may be used. Although the following description is provided in the context of the particular vehicle illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to an embodiment, vehicle 10 generally includes a plurality of subsystems 12, a plurality of vehicle sensors 14, and a vehicle control means in the form of a controller 16 (which, in a non-limiting embodiment such as that described below, comprises a vehicle control unit (VCU) (i.e., VCU 16)), among any number of other components, systems, and/or devices not illustrated or otherwise described herein.

Subsystems 12 of vehicle 10 may be configured to perform or control various functions and operations relating to the vehicle and, as illustrated in FIG. 2, may include any number of subsystems, such as, for example, a powertrain subsystem $12_1$, a chassis control or management subsystem $12_2$, a brake subsystem $12_3$, a driveline subsystem $12_4$, and a steering subsystem $12_5$, to cite only a few possibilities.

As is well known in the art, powertrain subsystem $12_1$ is configured to generate power or torque (also referred to below as "drive torque") that is used to propel the vehicle. The amount of torque generated by the powertrain subsystem may be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In an embodiment, however, the maximum output capacity of powertrain subsystem $12_1$ of vehicle 10 may be in the order of 600 Nm. As is known in the art, powertrain output torque may be measured using one or more of vehicle sensors 14 described below (e.g., an engine torque sensor, a driveline torque sensor, etc.) or other suitable sensing means, and may be used for a variety of purposes by one or more components, modules, or subsystems of vehicle 10 in addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, such as, for example, output torque sensors, control units, and/or any other suitable components known in the art. For instance, in an embodiment, powertrain subsystem $12_1$ may include one or more electric machines, for example, one or more electric machines operable as electrical generators, that are configured to apply retarding torque to a portion of the powertrain subsystem and/or one or more wheels of the vehicle so as to cause the vehicle to decelerate with or without the use of the brake subsystem (e.g., frictional braking). Accordingly, the present invention is not limited to any one particular powertrain subsystem.

Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name only a few possibilities. To that end, and as is well known in the art, chassis management subsystem $12_2$ may be further configured to monitor and/or control a variety of aspects or operational parameters of the vehicle using, for example, readings, signals, or information received from one or more of sensors 14 and/or other vehicle subsystems 12 described or identified herein. For example, subsystem $12_2$ may be configured to monitor the attitude of the vehicle. More particularly, subsystem $12_2$ may receive readings or information from one or more of sensors 14 and/or subsystems 12 described or identified herein (e.g., gyro sensors, vehicle acceleration sensors, etc.) to evaluate the pitch, roll, yaw, lateral acceleration, vibration (e.g., amplitude and frequency) of the vehicle (and/or the vehicle body, in particular), and therefore, the overall attitude of the vehicle. In any event, the information received or determined by chassis management subsystem $12_2$ may be utilized solely thereby or may alternatively be shared with other subsystems 12 or components (e.g., VCU 16) of vehicle 10 which may use the information for any number of purposes. While just one example of an operational parameter or aspect of the vehicle that chassis management subsystem $12_2$ may monitor and/or control has been provided, it will be appreciated that subsystem $12_2$ may be configured to control and/or monitor any number of other or additional parameters/aspects of vehicle 10 in the same or similar manner as that described above. As such, the present invention is not intended to be limited to the control and/or monitoring of any particular parameters/aspects. Moreover, it will be further appreciated that chassis management subsystem $12_2$ may be provided according to any number of different embodiments, implementations, or configurations and may include any number of different components, for example, sensors, control units, and/or any other suitable components known in the art. Accordingly, the present invention is not intended to be limited to any one particular chassis management subsystem.

As is well known in the art, brake subsystem $12_3$ may be configured to generate and control the amount of negative torque (also referred to as "retarding torque" or "braking torque") that is applied to or exerted on one or more wheels of vehicle 10. The application of a sufficient amount of such negative or retarding torque to the wheel(s) of vehicle 10 results in the slowing down and/or stopping of the progress of vehicle 10, and/or holding vehicle 10 at a standstill (e.g., if an insufficient amount of drive torque is being generated by the powertrain subsystem $12_1$ to either propel vehicle 10 in the intended direction of travel or hold vehicle 10 at a standstill without vehicle 10 rolling in a direction opposite the intended direction of travel). Brake subsystem $12_3$ may take any number of forms, including, but certainly not limited to, one or a combination of electro-hydraulic, electro-mechanical, regenerative, and brake-by-wire systems. It will be appreciated, therefore, that the present invention is not intended to be limited to any one particular type of brake subsystem.

In an embodiment, though certainly not the only embodiment, the chassis management subsystem $12_2$ and the brake subsystem $12_3$ may be functions performed within a single control means or controller (a description of a controller is provided below), which may be a brake controller (commonly referred to as the anti-lock brake system (ABS) controller), which is able to individually and separately control the retarding torque applied to each of the wheels of the vehicle. Alternatively the chassis management subsystem $12_2$ may receive and process signals from the vehicle sensors (as described above) and the brake subsystem $12_3$ may perform various control functions, for example those related to TC, SCS (e.g., DSC), and HDC, to cite only a few possibilities.

As illustrated in FIG. 1, driveline subsystem $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_4$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_4$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer unit 216 may be configured to operate in either a high range (HI) or low range (LO) gear ratio, which may be adjustable by driveline subsystem $12_4$ itself and/or by another component of vehicle 10, such as, for example, VCU 16. Those having ordinary skill in the art will appreciate that driveline subsystem $12_4$ may be provided according to any number of different embodiments, implementations, or configurations, may be connected in any number of different configurations, and may include any number of different components, like sensors (e.g., HI/LO ratio sensor, transmission gear ratio sensors, etc.), control units, and/or any other suitable components known in the art. Accordingly, the present invention is not intended to be limited to any one particular driveline subsystem.

In addition to those subsystems described above, vehicle 10 may further comprise any number of other or additional subsystems, such as, for example, a steering subsystem $12_5$. For the purposes of this invention, each of the aforementioned subsystems 12, and the functionality corresponding thereto, is conventional in the art. As such, detailed descriptions will not be provided; rather, the structure and function of each identified subsystem 12 will be readily apparent to those having ordinary skill in the art.

In any event, in an embodiment, one or more of subsystems 12 may be under at least a certain degree of control by VCU 16 (a detailed description of which will be provided below). In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem $12_1$ as an example, powertrain subsystem 12₁ may be configured to gather various types of information relating to certain operating parameters thereof, such as, for example, torque output, engine or motor speed, etc., and to communicate that information to VCU 16. This information may be gathered from, for example, one or more of vehicle sensors 14 described below. Powertrain subsystem 12₁ may also receive commands from VCU 16 to adjust certain operating parameters when, for example, a change in conditions dictates such a change (e.g., when a change in vehicle speed has been requested via a brake pedal (pedal 18 in FIG. 1) or an accelerator pedal (pedal 20 in FIG. 1) of vehicle 10). While the description above has been with particular reference to powertrain subsystem 12₁, it will be appreciated that the same principle applies to each such other subsystem 12 that is configured to exchange information/commands with VCU 16 or directly with one another.

Each subsystem 12 may include a dedicated control means in the form of one or more controllers (e.g., one or more electronic control units (ECUs)) configured to receive and execute instructions or commands provided by VCU 16, and/or to perform or control certain functionality independent from VCU 16. Alternatively, two or more subsystems 12 may share a single controller (e.g., the chassis management subsystem and brake subsystem may be implemented within a single controller as described above), or one or more subsystems 12 may be directly controlled by the VCU 16 itself. In an embodiment wherein a subsystem 12 communicates with VCU 16 and/or other subsystems 12, such communication may be facilitated via any suitable wired or wireless connection, such as, for example, a controller area network (CAN) bus, a system management bus (SMBus), a proprietary communication link, or through some other arrangement known in the art.

For purposes of this disclosure, it is to be understood that the controller(s) described herein can each comprise a control unit or computational device having one or more electronic processors. Vehicle 10 and/or a subsystem 12 thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present invention.

Vehicle sensors 14 may comprise any number of different sensors, components, devices, modules, systems, etc. In an embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to vehicle 10 and the operation and configuration thereof, and may include, for example and without limitation, any one or more of: wheel speed sensor(s); ambient temperature sensor(s); atmospheric pressure sensor(s); tyre pressure sensor(s); gyro sensor(s) to detect yaw, roll, and pitch of the vehicle; vehicle speed sensor(s); longitudinal acceleration sensor(s); engine torque sensor(s); driveline torque sensor(s); throttle valve sensor(s); steering angle sensor(s); steering wheel speed sensor(s); gradient sensor(s); lateral acceleration sensor(s) on, for example, the stability control system (SCS); brake pedal position sensor(s); brake pedal pressure sensor(s); accelerator pedal position sensor(s); air suspension sensor(s) (i.e., ride height sensors); wheel position sensor(s); wheel articulation sensor(s); vehicle body vibration sensor(s); water detection sensor(s) (for both proximity and depth of wading events); transfer case HI-LO ratio sensor(s); air intake path sensor(s); vehicle occupancy sensor(s); and longitudinal, lateral, and vertical motion sensor(s), among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 may receive certain information from the ECU of a subsystem 12 rather than directly from a sensor 14. It should be appreciated that the foregoing scenarios represent only some of the possibilities, as vehicle 10 is not limited to any particular sensor(s) or sensor arrangement(s); rather any suitable embodiment may be used.

In an embodiment, VCU 16 may comprise any suitable ECU, and may include any variety of electronic processing devices, memory devices, input/output (I/O) devices, and/or other known components, and perform various control and/or communication related functions. In an embodiment, VCU 16 includes an electronic memory device 22 that may store various information, sensor readings (e.g., such as those generated by vehicle sensors 14), look-up tables or other data structures (e.g., such as those used in the performance of the method described below), algorithms (e.g., the algorithms embodied in the method described below), etc. Memory device 22 may comprise a carrier medium carrying a computer-readable code for controlling one or more components of vehicle 10 to carry out the method(s) described below. Memory device 22 may also store pertinent characteristics and background information pertaining to vehicle 10 and subsystems 12. VCU 16 may also include one or more electronic processing devices 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when or as required. In addition to the functionality that may be performed by VCU 16 described elsewhere herein, in an embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments, implementations, or configurations could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in an embodiment, vehicle 10 may further comprise one or more automatic vehicle speed control systems. For example and with continued reference to FIG. 2, in an embodiment, vehicle 10 may further comprise a cruise control system 26, also referred to as an "on-highway" or "on-road" cruise control system, and a low-speed progress (LSP) control system 28, which may be referred to an "off-highway" or "off-road" progress control system.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem 12₁), or for example, VCU 16 (as is illustrated in FIG. 2).

Figure 3:
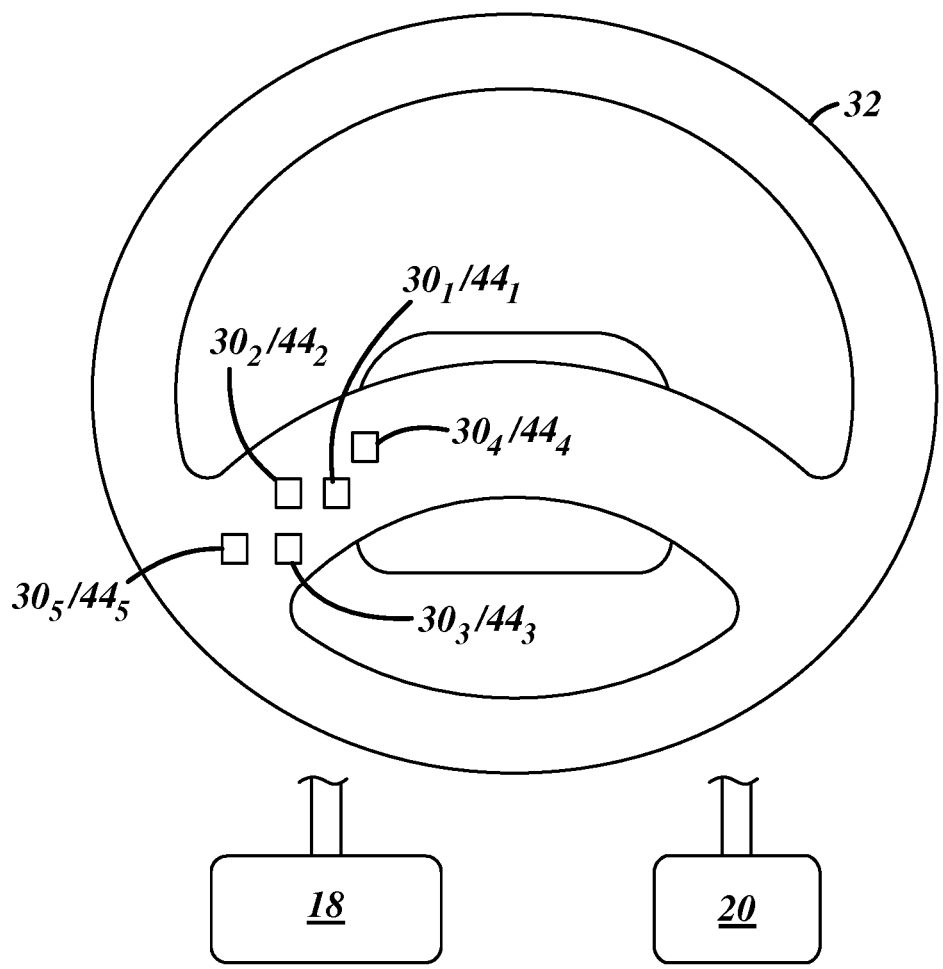
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, center console, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button 30₁ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button 30₂ may be provided to allow the user to increase the set-speed in discrete increments (e.g., 1 mph (or 1 kph)), and a "−" button 30₃ to allow the user to decrease the set-speed in the same or different discrete increments. Alternatively, the "+" and "−" buttons 30₂, 30₃ may be integrated into a single user-selectable device. Additional user-selectable interface devices of system 26 may include, for example, a "cancel" button 30₄ to deactivate the system, as well as a "resume" button 30₅ to allow for the system to be re-activated following a temporary suspension of the system function, for example standard cruise control system go into a standby state where they do not control vehicle speed if the user brakes as detailed further below.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without, for example, any pedal inputs being required by the user. This low-speed progress control function differs from that of cruise control system 26 in that unlike cruise control system 26, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user presses or depresses the brake or the clutch pedals, for example, the on-road cruise control function is suspended and the vehicle reverts to a manual mode of operation requiring user pedal input to maintain vehicle speed and a dedicated operator input (e.g., a "resume" button) is needed to reactivate the cruise control in an active mode in which it controls vehicle speed to the previously set set-speed. In addition, in at least certain cruise control systems, the detection of a wheel slip event, which may be initiated by a loss of traction, may also have the effect of cancelling the cruise control function. LSP control system 28 may also differ from such cruise control systems in that, in at least an embodiment, it is configured in such a way that the speed control function provided thereby may not be cancelled or deactivated in response to those events described above. In an embodiment, LSP control system 28 is particularly suited for use in off-road or off-highway driving.

In an embodiment, LSP control system 28 includes, among potentially other components, a control means in the form of a controller 42, which, in an embodiment such as that described below, comprises an ECU (i.e., ECU 42) (shown, in the illustrated embodiment and for reasons described below, as comprising VCU 16), and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: detecting brake and brake release commands initiated by a user or vehicle occupant; automatically commanding and controlling a drive torque generated by the powertrain subsystem $12_1$ and/or a retarding torque generated and applied to one or more wheels of vehicle 10 by, for example, brake subsystem $12_3$; determining the type and/or one or more characteristics of the terrain over which vehicle 10 is traveling; etc. Further, in an embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up tables or other data structures, algorithms, software, acceleration/deceleration profile(s), and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, identify the particular type of terrain vehicle 10 is traversing, and otherwise interact with system 28 as may be described below. These user interface devices may also allow for system 28 to provide certain notifications, alerts, messages, requests, etc. to the user including, but not limited to, those described herein below. Each of these devices may take any number of forms, such as, for example and without limitation, one or more of: a pushbutton; a switch; a touch screen; a visual display; a speaker; a heads-up display; a keypad; a keyboard; a selector knob or dial; or any other suitable device. Additionally, these devices may be located at any number of locations within the vehicle cabin and in relatively close proximity to the user (e.g., steering wheel, steering column, dashboard, etc.). In an embodiment, user interface devices 30, 44 of on-highway cruise control system 26 and LSP control system 28, respectively, are arranged adjacent to one another within vehicle 10, and, in an embodiment, on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one illustrative embodiment of LSP control system 28 will now be provided. First, VCU 16, which in the embodiment described herein comprises the ECU of LSP control system 28, determines the desired speed at which the vehicle is to travel (referred to herein as "the desired set-speed"). This may be a set-speed selected by the user via user interface devices 44, or alternatively, VCU 16 may be configured to automatically determine or select a desired set-speed, or temporarily modify a user-selected set-speed, based on certain conditions or factors and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively or individually, to either achieve or maintain the vehicle at the desired set-speed. In an embodiment, this may comprise VCU 16 generating and sending appropriate commands to the appropriate subsystems 12 (such as powertrain subsystem $12_1$ and brake subsystem $12_3$), for example, and/or directly controlling the operation of one or more components, modules, subsystems, etc. of vehicle 10.

Figure 4:
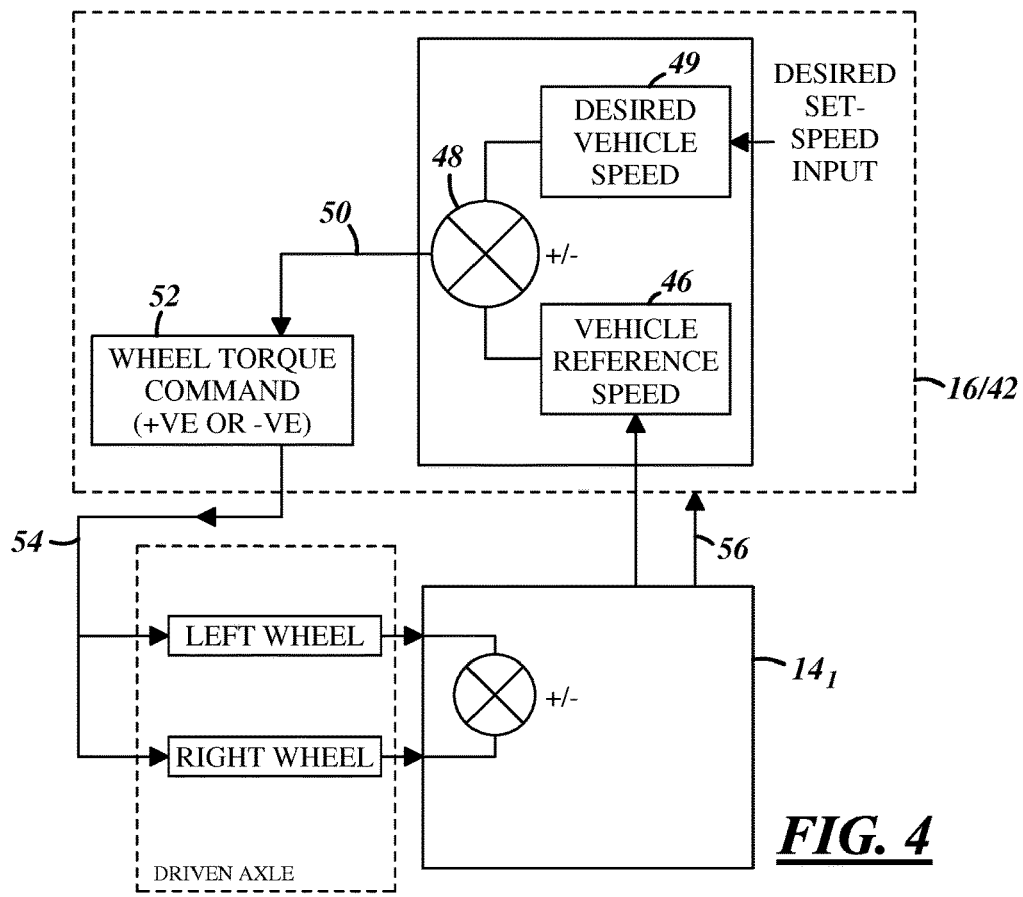
FIG. 4 is a schematic and block diagram illustrating the operation of an example of a speed control system of a vehicle, such as the vehicle illustrated in FIGS. 1 and 2.

More particularly, and with reference to FIG. 4, once the desired set-speed is determined, a vehicle speed sensor (identified as sensor $14_1$ in FIG. 4) associated with the vehicle chassis or driveline provides a signal 46 indicative of vehicle speed to VCU 16. In an embodiment, VCU 16 includes a comparator 48 which compares the desired set-speed (represented with reference numeral 49 in FIG. 4) with the measured speed 46, and provides an output signal 50 indicative of the comparison. The output signal 50 is provided to an evaluator unit 52, which interprets the output signal 50 as either a demand for additional torque to be applied to the vehicle wheels by, for example, powertrain subsystem $12_1$, or for a reduction in torque to be applied to the vehicle wheels, by, for example, brake subsystem $12_3$, depending on whether the vehicle speed needs to be increased or decreased to maintain or achieve the desired set-speed, and in the latter instance, to do so in accordance with a predetermined or prescribed acceleration profile, an acceleration corridor (e.g., +/−(0.1 g-0.2 g)), or both. An output 54 from the evaluator unit 52 is then provided to one or more subsystems 12 so as to manage the torque applied to the wheels, depending on whether there is a positive or negative demand for torque from the evaluator unit 52. In order to initiate the necessary positive or negative torque being applied to the wheels, the evaluator unit 52 may either command that additional power is applied to the vehicle wheels and/or that a braking force is applied to the vehicle wheels, either or both of which may be used to implement the change in torque that is necessary to achieve or maintain the desired vehicle set-speed. Synchronized application of positive (i.e., drive) and negative (i.e., retarding) torque to the wheels to control the net torque applied thereto and is commanded by LSP control system 28 to maintain vehicle stability and composure and regulate torque applied across each axle, in particular, in the event of a slip event occurring at one or more wheel. In certain instances, VCU 16 may also receive a signal 56 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event, for example by temporarily reducing the set-speed or reducing the drive torque so as to reduce wheel slip.

In addition to the functionality described above, in an embodiment, LSP control system 28 may be further configured to detect, sense, derive, or otherwise determine information relating to the terrain over which vehicle 10 is traveling (e.g., terrain type, surface type, terrain classification, terrain or surface roughness, etc.). In accordance with an embodiment, VCU 16 may be configured to perform this function and to do so in a number of ways. One such way is that described in UK Published Application No. GB2492748A published on 16 Jan. 2013, the entire contents of which are incorporated herein by reference. More particularly, in an embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the classification, roughness, etc. of the terrain.

More specifically, in an embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is traveling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude vertical wheel excitement indicative of a washboard type surface). The SCS activity signal is derived from several outputs from the ECU of a stability control system (SCS), which contains a dynamic stability control (DSC) function, a terrain control (TC) function, anti-lock braking system (ABS) and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In an embodiment, and in addition to the estimator module, a road roughness module may also be included for calculating the terrain roughness based on air suspension sensors (the ride height or suspension articulation sensors) and wheel accelerometers. In such an embodiment, a terrain indicator signal in the form of a roughness output signal is output from the road roughness module.

In any event, the estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes (e.g., terrain modes) is most appropriate based on the indicators of the type of terrain over which the vehicle is traveling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), chassis management subsystem $12_2$, or another suitable component may be appropriately configured to do so, and such other embodiments remain within the spirit and scope of the present invention.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any particular embodiments or arrangements.

Again, the preceding description of vehicle 10 and the illustrations in FIGS. 1 and 2 are only intended to illustrate one potential vehicle arrangement and to do so in a general way. Any number of other vehicle arrangements and architectures, including those that differ significantly from the one shown in FIGS. 1 and 2, may be used instead.

Figure 5:
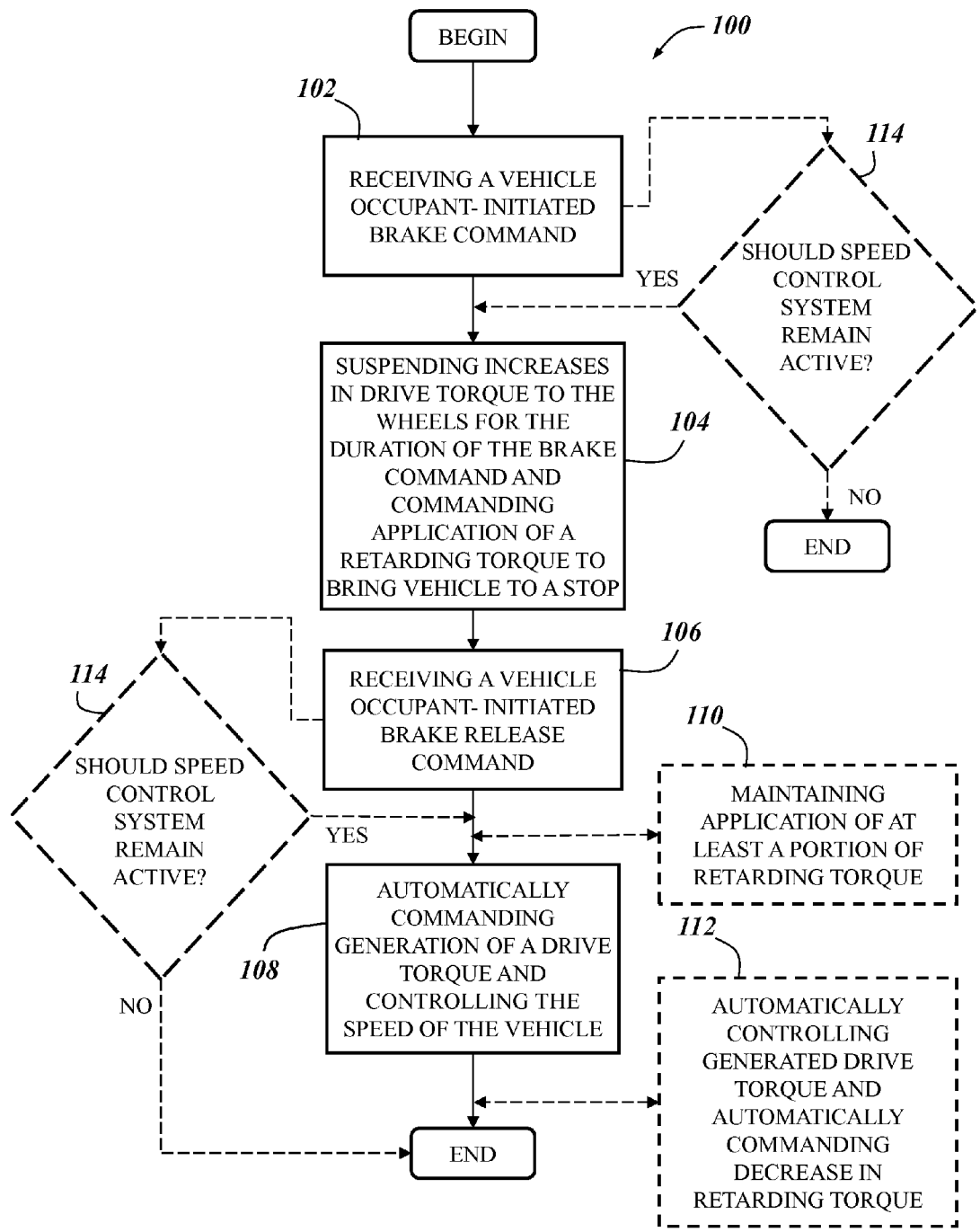
FIG. 5 is a flow diagram depicting various steps of an embodiment of a method of operating an automatic speed control system of a vehicle, such as the speed control system illustrated in FIG. 4 of the vehicle illustrated in FIGS. 1 and 2.

Turning now to FIG. 5, there is shown an example of a method 100 for operating an automatic speed control system of a vehicle in accordance with a prescribed set-speed. For purposes of illustration and clarity, method 100 will be described in the context of vehicle 10 illustrated in FIGS. 1 and 2 and described above, including the low-speed progress (LSP) control system 28 of vehicle 10, which, in an embodiment and for purposes of illustration, is integrated in VCU 16 (i.e., VCU 16 comprises ECU 42 of LSP control system 28). It will be appreciated however, that the application of the present methodology is not meant to be limited solely to such an arrangement, but rather method 100 may find application with any number of other speed control system arrangements, including, for example, LSP control systems other than that described above (e.g., not integrated into the VCU of a vehicle, and/or the VCU does not comprise the ECU of the speed control system), as well as, in at least certain instances, conventional "on-highway" cruise control systems, such as, for example, cruise control system 26 described above. Accordingly, the present invention is not meant to be limited to any one particular arrangement or type of speed control system. Additionally, it will be appreciated that unless otherwise noted, the performance of method 100 is not meant to be limited to any one particular order or sequence of steps or to any particular component(s) for performing the steps.

In an embodiment, method 100 comprises a step 102 of receiving a vehicle occupant-initiated brake command to slow the vehicle to a stop. More specifically, in an embodiment, step 102 comprises receiving one or more electrical signals representative of the brake command. This command may be received from a number of sources, and as such, this step may be performed in a number of ways. For example, in an embodiment, the command may be received directly from a brake activation/deactivation device such as a brake pedal (e.g., brake pedal 18), or from one or more sensors (e.g., one or more of vehicle sensors 14) associated therewith, for example, a brake pedal pressure sensor. When a user or vehicle occupant actuates or manipulates (e.g., presses or depresses) a brake activation/deactivation device one or more electrical signals representative of the vehicle occupant-initiated brake command may be generated. In another embodiment, the command may be received from a subsystem of the vehicle, for example, the brake subsystem (e.g., brake subsystem $12_3$), which, in turn, may detect or receive the command from a brake activation/deactivation device or one or more sensors associated therewith. In such an instance, the subsystem may generate one or more electrical signals representative of the vehicle occupant-initiated brake command upon receipt of the brake command. Accordingly, it will be appreciated in view of the foregoing that the present invention is not intended to be limited to any one particular technique or source from which the command may be received. In any event, the speed control system (e.g., LSP speed control system 28) is operable to remain in an active state in response to the generation and receipt of the brake command (i.e., the operation of the speed control system is not deactivated or cancelled). In an embodiment, the above described functionality of step 102 may be performed by VCU 16 or another suitable component of either LSP control system 28 or vehicle 10.

In response to the receipt of the brake command in step 102, method 100 moves to a step 104 of automatically suspending any increases (e.g., automatic increases) in drive torque that are required to maintain speed control of the vehicle in accordance with the set-speed at which the speed of the vehicle was maintained prior to receipt of the brake command, and automatically commanding the application of a retarding torque to one or more wheels of the vehicle to slow the vehicle and bring it to a stop, all the while maintaining the speed control system in an active state. More specifically, in step 104, the speed control system remains in an active state in the sense that its overall operation is not deactivated or cancelled in response to the brake command such that the user or vehicle occupant has to take affirmative steps to specifically reactivate the system when the vehicle resumes progress or motion in an intended direction of travel (e.g., manipulate a user interface device of the speed control device, manipulate the acceleration pedal, etc.). Rather, the specific functionality of maintaining the speed of the vehicle at the set-speed by automatically increasing the drive torque when a deviation between vehicle speed and set-speed is detected, is temporarily suspended to allow the vehicle to be slowed and brought to a stop in accordance with the user's command to do so, but the speed control system nonetheless remains in an active state of operation.

As set forth above, step 104 also includes commanding (i.e., via one or more electrical signals) the application of a sufficient amount of retarding or negative torque to one or more wheels of the vehicle to bring the vehicle to a stop. In an embodiment, step 104 may comprise commanding the application of a sufficient amount of retarding torque to bring the vehicle to a stop in accordance with a prescribed acceleration/deceleration profile (stored on, for example, the VCU 16), which may comprise an acceleration/deceleration corridor comprising a range between a desired deceleration and a maximum desired deceleration. In an embodiment, this corridor may be +/−(0.1-0.2 g); though it will be appreciated that other corridor ranges may also be useful and reference herein to a specific corridor is not considered to be limiting, as in some circumstances it may be preferred, for example, to have a steeper deceleration corridor than acceleration corridor in order to promote user confidence that the system is responding promptly to their commands. Alternatively, of course, the deceleration may be directly dependent upon user brake demand input.

The retarding torque may be applied by any number of means or sources. For example, in an embodiment, the brake subsystem of the vehicle (e.g., brake subsystem $12_3$ of vehicle 10) may be commanded to apply a retarding torque to one or more of the vehicle wheels (e.g., the retarding torque may be applied via a brake disc of a wheel). If appropriately configured, the powertrain subsystem of the vehicle (e.g., powertrain subsystem $12_1$ of vehicle 10) may also or alternatively be commanded to apply a retarding torque indirectly to one or more of the vehicle wheels. More particularly, in an embodiment wherein the powertrain subsystem includes one or more electric machines, for example, one or more electric machines operable as electrical generators, that are configured to apply retarding torque to a portion of the powertrain subsystem and/or one or more wheels of the vehicle so as to cause the vehicle to decelerate with or without the use of the brake subsystem, the powertrain subsystem may be commanded to apply the retarding torque. In other embodiments, components other than the brake and powertrain subsystems may be utilized, including, for example and without limitation, a hill descent control (HDC) system of the vehicle, the driveline subsystem of the vehicle (e.g., driveline subsystem $12_4$ of vehicle 10) through a gear shift or change in gear ratio, etc. Accordingly, it will be appreciated that the present invention is not limited to any particular source of retarding torque; rather, any number of sources, either alone or in combination, may be utilized.

The particular amount of retarding torque that is commanded to be applied (and/or the rate at which it is achieved or applied) in step 104 may be dependent upon one or combination of factors. These factors may include, for example and without limitation, the speed of the vehicle, the particular set-speed at which the speed control system is to maintain the speed of the vehicle, and/or the amount or magnitude of drive torque being generated by the powertrain subsystem, and therefore, applied to the wheels, when the brake command is received in step 102. In any event, the magnitude of the retarding torque and/or the rate at which it is applied may be determined in a number of ways. For example, in an embodiment, one or more of the aforementioned factors may be used with a data structure, for example, an empirically-derived look up table or profile that correlates one or more of the factors with one or both of the retarding torque magnitude and the rate at which such torque is to be applied. In another embodiment, a closed-loop control system (e.g., PID controller embodied in software in the component performing step 104) or any other suitable technique may be used. In an embodiment, the above described functionality of step 104 may be performed by VCU 16 or another suitable component of either LSP control system 28 or vehicle 10.

Either upon receipt of the vehicle occupant-initiated brake command signal or once the vehicle has been brought to a stop, the positive drive torque may be ramped out, i.e., it may be reduced gradually over time.

During the braking phase prior to the vehicle coming to a stop, the speed control system may retain an element of drive torque acting against the retarding torque such that the vehicle is slowed in a composed manner. The retained element of drive torque may be the amount of torque determined to be required to maintain the instantaneous speed in the absence of a retarding torque. In this manner if the user/vehicle occupant (i.e., driver) were to release the brakes prior to the vehicle stopping, a smooth transition would be made to progress under drive torque. In addition, when the vehicle was brought to a standstill, the residual drive torque would be the torque required to retain the vehicle at a standstill if, for example, an external force such as gravity were acting in the direction of previous travel. Once at a standstill, the positive torque may be ramped out as stated above.

Following step 104, method 100 may further include a step 106 of receiving a vehicle occupant-initiated brake release command indicating the vehicle occupant or user's desire to resume or continue movement or progress of the vehicle in an intended direction of travel. More specifically, in an embodiment, step 106 comprises receiving one or more electrical signals representative of the brake release command. As with the brake command received in step 102, the brake release command may be received from a number of sources, and as such, this step may be performed in a number of ways. For example, in an embodiment, the brake release command may be received directly from a brake activation/deactivation device such as the brake pedal of the vehicle (e.g., brake pedal 18 of vehicle 10), or from one or more sensors (e.g., one or more of vehicle sensors 14) associated therewith, for example, a brake pedal pressure sensor. In any of these instances, when a user or vehicle occupant appropriately manipulates (e.g., releases) the brake activation/deactivation device at least an amount sufficient to indicate a desire to resume movement or progress of the vehicle, one or more electrical signals representative of the vehicle occupant-initiated brake release command may be generated. In another embodiment, the command may be received from a subsystem of the vehicle, for example, the brake subsystem (e.g., brake subsystem $12_3$), which, in turn, may detect or receive the command from a brake activation/deactivation device or one or more sensors associated therewith. In such an instance, the subsystem may generate one or more electrical signals representative of the vehicle occupant-initiated brake release command upon receipt of the brake release command. Accordingly, it will be appreciated in view of the foregoing that the present invention is not intended to be limited to any one particular technique by which the brake release command may be generated. In any event, the speed control system (e.g., LSP speed control system 28) is operable to remain in an active state both prior and in response to the generation and receipt of the brake release command. In an embodiment, the above described functionality of step 106 may be performed by VCU 16 or another suitable component of either LSP control system 28 or vehicle 10.

In response to the receipt of the brake release command in step 106, method 100 moves to a step 108 of automatically commanding (i.e., via one or more electrical signals) the generation of a drive torque sufficient to propel the vehicle in an intended direction of travel and automatically controlling the speed of the vehicle in accordance with the prescribed set-speed. In an embodiment, the commanding of the generation of the drive torque and/or the controlling of the speed of the vehicle may be done so in accordance with a prescribed acceleration/deceleration profile (stored on, for example, the VCU 16), which, as described above, may comprise an acceleration/deceleration corridor comprising a range between a desired acceleration and a maximum desired acceleration. For example, in an embodiment, the acceleration/deceleration profile may have acceleration/deceleration corridor of +/−(0.1-0.2 g); though in other embodiments other ranges may be useful. In another embodiment, the commanding of the drive torque and controlling of the vehicle speed in step 108 may comprise doing so to propel the vehicle in the intended direction of travel at the set-speed and irrespective of any acceleration profile or rate.

In any event, step 108 comprises commanding, for example, the powertrain subsystem of the vehicle (e.g., powertrain subsystem $12_1$ of vehicle 10) to generate a certain amount of drive torque that is sufficient to resume movement or progress of the vehicle in accordance with the prescribed set-speed of the speed control system. Accordingly, in an embodiment, one or more electrical signals may be generated and communicated to the powertrain subsystem of vehicle to cause the vehicle to resume movement or progress in the intended direction of travel (i.e., to accelerate the vehicle from a stop up to the set-speed, or at least initially, a speed less than the set-speed (e.g., a minimum set-speed at which the speed control system can control/maintain the vehicle speed)). As with the application of the retaining torque described above, the particular amount of drive torque that the powertrain subsystem is commanded to generate (and the rate at which it is generated) in step 108 may be dependent upon one or combination of factors. These factors may include, for example and without limitation, the particular set-speed at which the speed control system is to maintain the speed of the vehicle, the minimum set-speed of the speed control system, and/or the amount or magnitude of the retarding torque being applied to one or more wheels of the vehicle that must be overcome or counteracted to propel the vehicle, to cite a few possibilities. In any event, the magnitude of the drive torque that is generated and/or the rate at which it is generated may be determined in a number of ways. For example, in an embodiment, one or more of the aforementioned factors may be used with a data structure, for example, an empirically-derived look up table or profile, that correlates one or more of the factors with one or both of the drive torque magnitude and the rate at which such torque is to be generated. In another embodiment, a closed-loop control system (e.g., PID controller embodied in software in the component performing step 108) or any other suitable technique may be used.

Once a sufficient amount of drive torque to propel the vehicle has been generated and the vehicle resumes movement or progress, step 108 thereafter comprises automatically controlling the speed of the vehicle in accordance with the prescribed set-speed. This may be accomplished or achieved, for example, in the manner described above and illustrated in FIG. 4 with respect to LSP control system 28; though the present invention is not intended to be limited to any particular technique(s). In an embodiment, the above described functionality of step 108 may be performed by VCU 16 or another suitable component of either LSP control system 28 or vehicle 10.

In an embodiment, once the vehicle is brought to a stop or standstill in step 104, method 100 may further comprise a step 110 of maintaining the application of at least a portion of the retarding torque applied in step 104, even after the receipt of a brake release command in step 106, to hold the vehicle at a standstill. Step 110 is intended to prevent the vehicle from moving in the intended direction of travel as a result of one or more external forces acting on the vehicle (e.g., a gravitational force, in an instance where the vehicle is pointing down a gradient), or in the direction opposite the intended direction of travel as a result of one or more external forces acting on the vehicle (e.g., a gravitational force, in an instance where the vehicle is pointing up a gradient). The amount of retarding torque that is maintained may be equal to the minimal amount of retarding torque required to prevent any forward or backward movement of the vehicle as a result of external forces acting on the vehicle, and the that minimal amount may be determined in any number of suitable ways, including, but not limited to, those described above with respect to step 104. In an embodiment, the above described functionality of step 110 may be performed by VCU 16 or another suitable component of either LSP control system 28 or vehicle 10.

In an embodiment wherein method 100 includes step 110, method 100 may further include a step 112 that is performed after the automatic commanding of the generation of a drive torque sufficient to propel the vehicle in the direction of travel, and that comprises automatically controlling the drive torque generated by the powertrain subsystem, and automatically commanding a decrease in the applied retarding torque when a sufficient amount of drive torque has been generated that is equal to or greater than the maintained portion of the retarding torque. In other words, in an embodiment, application of at least a portion of the applied retarding torque is maintained until a sufficient amount of drive torque has been generated to overcome the remaining retarding torque and/or any external forces having a decelerating affect on the vehicle (i.e., in an instance where the vehicle is to ascend a gradient) to propel the vehicle in the intended direction of travel, at which time the retarding torque may be modified or adjusted down to substantially zero all at once or gradually.

As with the application of the retarding torque in step 104 and the generation of the drive torque and/or control of the vehicle speed in step 108, in an embodiment, the controlling of the drive torque and/or the commanding of the decrease in the retarding torque in step 112 may be done so to propel and accelerate the vehicle in accordance with a prescribed acceleration/deceleration profile (stored on, for example, the VCU 16), which, as described above, may comprise an acceleration/deceleration corridor comprising a range between a desired acceleration and a maximum desired acceleration. For example, in an embodiment, the acceleration/deceleration profile may have acceleration/deceleration corridor of +/−(0.1-0.2 g); though other ranges may also be useful. In another embodiment, the controlling of the drive torque and/or the commanding of the decrease in the retarding torque may comprise doing so to propel or accelerate the vehicle irrespective of any acceleration profile or rate. In an embodiment, the above described functionality of step 112 may be performed by VCU 16 or another suitable component of either LSP control system 28 or vehicle 10.

Once the vehicle resumes movement and the speed control system once again automatically controls the speed of the vehicle in accordance with the set-speed, the above process may be repeated upon the receipt of another vehicle occupant-initiated brake command (i.e., a second brake command) being received to bring the vehicle to a stop. Accordingly, once such a command is received in step 102, step 104 may be repeated as described above; and once a subsequent vehicle occupant-initiated brake release command (i.e., a second brake release command) is received in step 106, step 108, and, if applicable, steps 110 and 112, may be repeated as described above. Accordingly, the functionality described above may be repeated any number of times until the speed control system as a whole, or the particular functionality described above, is deactivated or cancelled.

The functionality of method 100 described above may be a feature of the speed control system that this active or operable whenever the speed control system itself is active (i.e., the speed control system remains in an active state in response to a vehicle occupant-initiated brake command and/or brake release command). Alternatively, the speed control system may remain in an active state in response to a vehicle occupant-initiated brake command and/or brake release command only when a determination has been made that it should remain in such a state. In other words, in an embodiment, the speed control system is automatically deactivated when a vehicle occupant-initiated brake command and/or brake release command is received unless it is determined that it should remain active in response to such a command. Accordingly, in an embodiment, method 100 may include a step 114 of determining whether the speed control system should remain active in response to a vehicle occupant-initiated brake or brake release command; and this determination may be made, for example, when the speed control system is first activated or initialized (e.g., before a vehicle occupant-initiated brake command is received in step 102) and/or at any time during its operation, for example, following the receipt of a brake command in step 102 and/or a brake release command in step 106, as is illustrated in FIG. 5.

Step 114 may be performed or carried out in a number of ways. In one embodiment, a determination that the speed control system should remain active may be made in step 114 in response to a user input (e.g., one or more electrical signals) representative of a command or instruction to maintain the speed control system in an active state upon the receipt of a vehicle occupant-initiated brake command and/or brake release command. A vehicle occupant may provide this input using a suitably configured user interface device of the speed control system (e.g., one of user input devices 44 of LSP control system 28 described above) or another user interface device located in the vehicle cabin. This user input device may comprise, for example, a pushbutton or other user-selectable device, a stalk or steering column-mounted control located adjacent the steering wheel, a virtual button or icon displayed on a touch screen display, or any other suitable user-selectable device. In any event, in an embodiment, step 114 may comprise determining whether such a user input has been received, and if so, further determining that the speed control system should remain active in response to a vehicle occupant-initiated brake command and/or brake release command; otherwise, it may be determined that the speed control system should be deactivated in response to one or either of such commands.

Additionally, or alternatively, the determination made in step 114 may be made automatically by the speed control system without any user or vehicle occupant involvement. For example, a determination that the speed control system should remain active may be made automatically when one or more predetermined conditions are met. In an embodiment, one such condition is that the vehicle is traversing a particular type of terrain for which the functionality of method 100 is particularly suited. Accordingly, in an embodiment, step 114 may comprise first determining the type of terrain the vehicle is traversing, and then determining whether the prevailing terrain is one of one or more particular terrain types.

Determining the type of terrain may be performed in a number of ways. For example, in an embodiment, the speed control system may be configured to automatically determine the terrain type in the manner described in detail above with respect to LSP control system 28. For example, information relating to a variety of different parameters associated with the vehicle may be acquired from a plurality of vehicle sensors (e.g., sensors 14) and/or various vehicle subsystems (e.g., subsystems 12). The acquired information may then be evaluated and used to determine the terrain type. An additional or alternative way the terrain type may be determined is in response to a user input representative of a particular terrain type. A vehicle occupant may provide this input using a suitably configured user interface device, for example, a user interface device of the speed control system (e.g., one of user input devices 44 of LSP control system 28 described above), or another user interface device located within the vehicle cabin, for example, a knob, switch, pushbutton, touch screen display, or other suitable device that allows for the selection of a terrain type from one or a plurality of different terrain types. Accordingly, it will be appreciated that any number of techniques may be used to determine a terrain type, and therefore, the present invention is not intended to be limited to any particular technique(s) for doing so.

As briefly described above, once the prevailing terrain type is determined, step 114 may further include determining whether that terrain type is one of one or more terrain types for which it has been predetermined that the speed control system may remain in an active state in response to a vehicle occupant-initiated brake command and/or brake release command. Accordingly, step 114 may comprise comparing the prevailing terrain type with one or more predefined or predetermined terrain types stored in, for example, a data structure (e.g., look-up table). If the prevailing terrain type does, in fact, match one of the predetermined terrain types, then it may be determined in step 114 that the speed control system should remain active in response to a vehicle occupant-initiated brake command and/or brake release command; otherwise, it may be determined that the speed control system should be deactivated in response to one or both of such commands. The functionality described herein may be particularly suited for any number of terrain types, and therefore, the predetermined terrain types to which the prevailing terrain type is compared may include any number of different terrain types. An example of one such terrain type, though certainly not the only one, is that corresponding to or characterized by a rock or boulder terrain mode of operation of the vehicle. More specifically, such a terrain or terrain mode may be characterized by high positive and negative steps or swings in the torque (e.g., drive torque and/or retarding torque) required to acceptably and successfully traverse the terrain, and typically a high coefficient of friction. Examples of such a terrain may include, for example and without limitation, a rock or boulder field, walking steps or holes, and other similar terrains having multiple objects that a vehicle must negotiate.

In an embodiment, the functionality of step 114 described above may be performed by VCU 16, or another suitable component of LSP control system 28 or vehicle 10, along with, if applicable, a suitable user interface device 44.

In addition to the above, method 100 may further include a step (not shown) of notifying the occupant(s) of the vehicle whenever the speed control system will remain in an active state in response to a vehicle occupant-initiated brake command and/or brake release command. This notification, which may be provided when the speed control system is first activated and/or continuously or periodically while the system remains in the active state, may take any number of forms. For example, the notification may take the form of an audio and/or visual message broadcast to the vehicle occupants via a suitable user interface device located in the vehicle cabin in close proximity to the user/vehicle occupant(s) (e.g., near the steering wheel), for example, a speaker or visual display (e.g., a display device mounted in the dashboard of the vehicle, a heads-up display, etc.). Alternatively, the notification may take the form of an illuminated marker displayed on or near the instrument panel or dashboard of the vehicle, or any other suitable form. The notification is intended to prevent the vehicle occupant/user from being surprised or caught off guard when the speed control system remains active in response to a vehicle occupant-initiated brake command and/or brake release command (e.g., that the speed control system resumes control of the vehicle speed upon the receipt of a brake release command) and, in an embodiment, may allow or afford the vehicle occupant/user the opportunity to override the speed control system and deactivate or cancel its speed control functionality. In any event, in an embodiment, this functionality may be performed by VCU 16, or another suitable component of LSP control system 28 or vehicle 10, along with a suitable user interface device of LSP control system 28 or vehicle 10.

It will be appreciated in view of the above that a benefit or advantage of the present invention, among potentially others, is that the speed control system may be maintained in an active state when the user brings the vehicle to a stop (e.g., by actuating a brake pedal of the vehicle) and then subsequently initiates a brake release command to resume movement (e.g. by releasing the brake pedal). This results in the speed control of the vehicle being resumed by the speed control system without requiring any user interaction other than the initiation of the brake release command (e.g., the release of the brake pedal). Accordingly, it is contemplated that this functionality may allow a vehicle occupant/user to utilize the speed control system up to a particular obstacle, engage the brake pedal to temporarily bring the vehicle to a stop, and then release the brake pedal to resume progress of the vehicle under the control of the speed control system and in accordance with a prescribed set-speed, all without deactivating or cancelling the speed control system in a manner that would require additional user intervention or involvement to reactivate or restart the system other than the manipulation of the brake pedal or other brake activating/deactivating device described elsewhere above. As such, in an embodiment, progress of the vehicle may be controlled solely by use of the brake pedal (or another brake activating/deactivating device) of the vehicle, which greatly reduces user workload and user irritation as compared to having to manually reactivate the speed control system each time the vehicle is brought to a stop or standstill, and may also improve or enhance the enjoyment of the vehicle occupant(s)/user.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method of operating an automatic speed control system of a vehicle in accordance with a set-speed, comprising:
   receiving at least one electrical signal representative of a vehicle occupant-initiated brake command to slow the vehicle to a stop;
   in response to the brake command, suspending increases in drive torque to the wheels of the vehicle for the duration of the brake command and applying a retarding torque to one or more wheels of the vehicle to bring the vehicle to a stop, while maintaining the speed control system in an active state;
   gradually reducing over time the drive torque from a drive torque level being applied when the vehicle is brought to a stop;
   receiving at least one electrical signal representative of a vehicle occupant-initiated brake release command; and
   in response to the brake release command, and while maintaining the speed control system in an active state, automatically commanding the generation of a drive torque to propel the vehicle in an intended direction of travel and automatically controlling the speed of the vehicle in accordance with said set-speed.

2. The method of claim 1 further comprising gradually reducing over time the drive torque from a drive torque level being applied when the electrical signal(s) representative of a vehicle occupant-initiated brake command is received.

3. The method of claim 1, comprising:
   after bringing the vehicle to a stop, maintaining the application of at least a portion of the applied retarding torque to hold the vehicle at a standstill; and
   in response to the brake release command, after automatically commanding said generation of a drive torque sufficient to propel the vehicle in the intended direction of travel, automatically controlling the drive torque and automatically commanding a decrease in the applied retarding torque to propel the vehicle when a sufficient amount of drive torque has been generated that is equal to or greater than the maintained portion of the retarding torque.

4. The method of claim 3, wherein the controlling of the drive torque and the commanding of the decrease in the applied retarding torque comprises at least one of automatically controlling the drive torque or automatically commanding the decrease in the applied retarding torque at a rate sufficient to accelerate the vehicle in accordance with a predetermined acceleration profile.

5. The method of claim 1, wherein the commanding of the generation of a drive torque comprises automatically commanding the generation of a drive torque sufficient to propel the vehicle in the intended direction of travel at said set-speed.

6. The method of claim 1, wherein the commanding of the application of the retarding torque comprises automatically commanding the application of the retarding torque at a rate sufficient to decelerate the vehicle in accordance with a predetermined acceleration/deceleration profile.

7. The method of claim 1, wherein the commanding of the generation of the drive torque and the controlling of the speed of the vehicle comprises at least one of automatically commanding the generation of the drive torque or automatically controlling the speed of the vehicle at a rate sufficient to accelerate the vehicle in accordance with a predetermined acceleration/deceleration profile.

8. The method of claim 1, wherein the brake command corresponds to the actuation of a brake pedal by an occupant of the vehicle, and the brake release command corresponds to the subsequent release of the brake pedal by the occupant of the vehicle, and further wherein the method comprises maintaining the speed control system in an active state throughout the actuation and release of the brake pedal.

9. The method of claim 1, wherein the brake command comprises a first brake command and the brake release command comprises a first brake release command, the method further comprising:
receiving, following the receipt of the first brake release command, at least one electrical signal representative of a second vehicle occupant-initiated brake command to slow the vehicle to a stop;
in response to the second brake command, suspending increases in drive torque to the wheels of the vehicle for the duration of the brake command and applying a retarding torque to one or more wheels of the vehicle to bring the vehicle to a stop, while maintaining the speed control system in an active state;
receiving at least one electrical signal representative of a second vehicle occupant-initiated brake release command; and
in response to the second brake release command, and while maintaining the speed control system in an active state, automatically commanding the generation of a drive torque sufficient to propel the vehicle in an intended direction of travel and automatically controlling the speed of the vehicle in accordance with said set-speed.

10. The method of claim 1, comprising receiving a user instruction to maintain the speed control system in an active state upon the receipt of at least one of a vehicle occupant-initiated brake command or a vehicle occupant-initiated brake release command.

11. The method of claim 1, comprising notifying the occupant(s) of the vehicle when the speed control system will remain in an active state in response to at least one of a vehicle occupant-initiated brake command or vehicle occupant-initiated brake release command.

12. The method of claim 1, comprising:
determining the type of terrain the vehicle is traversing; and
maintaining the speed control system in an active state in response to at least one of a vehicle occupant-initiated brake command or a vehicle occupant-initiated brake release command only when the terrain is one of one or more particular terrain types.

13. The method of claim 12, wherein determining the terrain type comprises receiving a user input indicative of a terrain type.

14. The method of claim 12, wherein determining the terrain type comprises automatically determining the terrain type.

15. The method of claim 12, wherein one of the one or more particular terrain types corresponds to a rock/boulder terrain mode of operation of the vehicle.

16. A non-transitory, computer-readable storage medium storing instructions thereon that when executed by one or more electronic processors causes the one or more processors to carryout the steps of:
receiving at least one electrical signal representative of a vehicle occupant-initiated brake command to slow the vehicle to a stop;
in response to the brake command, suspending increases in drive torque to the wheels of the vehicle for the duration of the brake command and applying a retarding torque to one or more wheels of the vehicle to bring the vehicle to a stop, while maintaining the speed control system in an active state;
gradually reducing over time the drive torque from a drive torque level being applied when the vehicle is brought to a stop;
receiving at least one electrical signal representative of a vehicle occupant-initiated brake release command; and
in response to the brake release command, and while maintaining the speed control system in an active state, automatically commanding the generation of a drive torque to propel the vehicle in an intended direction of travel and automatically controlling the speed of the vehicle in accordance with said set-speed.

17. An automatic speed control system operable to automatically control the speed of a vehicle in accordance with a set-speed, comprising:
an electronic processor; and
an electronic memory device electrically coupled to the electronic processor and having instructions stored therein,
wherein the processor is configured to access the memory device and execute the instructions stored therein such that the system is operable to:
gradually reduce over time the drive torque from a drive torque level being applied when the vehicle is brought to a stop;
receive at least one electrical signal representative of a vehicle occupant-initiated brake command to slow the vehicle to a stop;
in response to the brake command, automatically suspend increases in drive torque to the wheels of the vehicle for the duration of the brake command and apply a retarding torque to one or more wheels of the vehicle to bring the vehicle to a stop, while maintaining the speed control system in an active state;
receive at least one electrical signal representative of a vehicle occupant-initiated brake release command; and
in response to the brake release command, and while maintaining the speed control system in an active state, automatically command the generation of a drive torque to propel the vehicle in an intended direction of travel and automatically control the speed of the vehicle in accordance with said set-speed.

18. The system of claim 17, wherein:
after the vehicle is brought to a stop, the electronic processor is operable to maintain the application of at least a portion of the applied retarding torque to hold the vehicle at a standstill; and
after automatically commanding said generation of a drive torque sufficient to propel the vehicle in the intended direction of travel, the electronic processor is operable to automatically control the drive torque and automatically command a decrease in the applied retarding torque to propel the vehicle when a sufficient amount of drive torque has been generated that is equal to or greater than the maintained portion of the retarding torque.

19. The system of claim 17, wherein the electronic processor is operable to at least one of automatically control the drive torque or automatically command the decrease in the applied retarding torque at a rate sufficient to accelerate the vehicle in accordance with a predetermined acceleration profile.

20. The system of claim 17, wherein the electronic processor is operable to automatically command the generation of a drive torque that is sufficient to propel the vehicle in the intended direction of travel at said set-speed.

21. The system of claim 17, wherein the electronic processor is operable to automatically command the application of the retarding torque at a rate sufficient to decelerate the vehicle in accordance with a predetermined acceleration/deceleration profile.

22. The system of claim 17, wherein the electronic processor is operable to at least one of automatically command the generation of the drive torque or automatically control the speed of the vehicle at a rate sufficient to accelerate the vehicle in accordance with a predetermined acceleration/deceleration profile.

23. The system of claim 17, wherein the brake command corresponds to the actuation of a brake pedal by an occupant of the vehicle, and the brake release command corresponds to the subsequent release of the brake pedal by the occupant of the vehicle, and further wherein the electronic processor is operable to maintain the speed control system in an active state throughout the actuation and release of the brake pedal.

24. The system of claim 17, wherein the brake command comprises a first brake command and the brake release command comprises a first brake release command, the electronic processor being operable to:
  receive, following the receipt of the first brake release command, at least one electrical signal representative of a second vehicle occupant-initiated brake command to slow the vehicle to a stop;
  in response to the second brake command, automatically suspend increases in drive torque to the wheels of the vehicle for the duration of the brake command and control the system to apply a retarding torque to one or more wheels of the vehicle to bring the vehicle to a stop, while maintaining the speed control system in an active state;
  receive at least one electrical signal representative of a second vehicle occupant-initiated brake release command;
  in response to the second brake release command, and while maintaining the speed control system in an active state, automatically command the generation of a drive torque sufficient to propel the vehicle in an intended direction of travel and automatically control the speed of the vehicle in accordance with said set-speed.

25. The system of claim 17, wherein the electronic processor is further operable to receive a user instruction to maintain the speed control system in an active state upon the receipt of at least one of a vehicle occupant-initiated brake command or a vehicle occupant-initiated brake release command.

26. The system of claim 17, wherein the electronic processor is further operable to notify the occupant(s) of the vehicle when the speed control system will remain in an active state in response to at least one of a vehicle occupant-initiated brake command or a vehicle occupant-initiated brake release command.

27. The system of claim 17, wherein the electronic process is further operable to:
  determine the type of terrain the vehicle is traversing; and
  maintain the speed control system in an active state in response to at least one of a vehicle occupant-initiated brake command or vehicle occupant-initiated brake release command only when the terrain is one of one or more particular terrain types.

28. The system of claim 27, wherein the electronic processor is further operable to receive a user input indicative of a terrain type, and to determine the terrain type based on that user input.

29. The system of claim 27, wherein the electronic processor is operable to automatically determine the terrain type.

30. The system of claim 27, wherein one of the one or more particular terrain types corresponds to a rock/boulder terrain mode of operation of the vehicle.

31. A vehicle comprising a powertrain for generating a drive torque, a braking system for generating a retarding torque, and an automatic speed control system operable to automatically control the speed of the vehicle in accordance with a set-speed, comprising:
  an electronic processor; and
  an electronic memory device electrically coupled to the electronic processor and having instructions stored therein,
  wherein the processor is configured to access the memory device and execute the instructions stored therein such that the system is operable to:
    gradually reduce over time the drive torque from a drive torque level being applied when the vehicle is brought to a stop;
    receive at least one electrical signal representative of a vehicle occupant-initiated brake command to slow the vehicle to a stop;
    in response to the brake command, automatically suspend increases in drive torque to the wheels of the vehicle for the duration of the brake command and apply a retarding torque to one or more wheels of the vehicle to bring the vehicle to a stop, while maintaining the speed control system in an active state;
    receive at least one electrical signal representative of a vehicle occupant-initiated brake release command; and
    in response to the brake release command, and while maintaining the speed control system in an active state, automatically command the generation of a drive torque to propel the vehicle in an intended direction of travel and automatically control the speed of the vehicle in accordance with said set-speed.

32. An electronic controller for a vehicle having a storage medium associated therewith storing instructions that when executed by the controller cause the automatic speed control of a vehicle in accordance with the method of:
  gradually reducing over time the drive torque from a drive torque level being applied when the vehicle is brought to a stop;
  receiving at least one electrical signal representative of a vehicle occupant-initiated brake command to slow the vehicle to a stop;
  in response to the brake command, suspending automatic speed control in accordance with said set-speed and applying a retarding torque to one or more wheels of the vehicle to bring the vehicle to a stop while maintaining the speed control system in an active state when the vehicle comes to a stop;
  receiving at least one electrical signal representative of a vehicle occupant-initiated brake release command; and
  in response to the brake release command, and while maintaining the speed control system in an active state, automatically commanding the generation of a drive torque to propel the vehicle in an intended direction of travel and automatically controlling the speed of the vehicle in accordance with said set-speed.

* * * * *